US006553240B1

(12) United States Patent
Dervarics

(10) Patent No.: US 6,553,240 B1
(45) Date of Patent: Apr. 22, 2003

(54) PRINT OPTION FOR WAP BROWSERS

(75) Inventor: Gergely Dervarics, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/475,757

(22) Filed: Dec. 30, 1999

(51) Int. Cl.[7] ................................................. H04B 1/38
(52) U.S. Cl. ....................... 455/566; 455/414; 455/550; 455/557; 709/239; 709/219
(58) Field of Search .................. 455/557, 414, 455/550, 556, 566, 422; 370/328, 338, 351, 356, 400, 402; 709/238, 209, 227, 207, 329; 313/200

(56) References Cited

U.S. PATENT DOCUMENTS

| | | | | |
|---|---|---|---|---|
| 5,870,679 A | * | 2/1999 | Ezumi | |
| 6,088,594 A | * | 7/2000 | Kingdon et al. | |
| 6,148,405 A | * | 11/2000 | Liao | 713/201 |
| 6,161,007 A | * | 12/2000 | McCutcheon | 455/412 |
| 6,181,284 B1 | * | 1/2001 | Madson | 343/702 |
| 6,185,208 B1 | * | 2/2001 | Liao | 370/392 |
| 6,185,535 B1 | * | 2/2001 | Hedin | 704/270 |
| 6,211,858 B1 | * | 4/2001 | Moon et al. | |
| 6,223,291 B1 | * | 4/2001 | Puhl | 713/201 |
| 6,289,212 B1 | * | 9/2001 | Stein et al. | |
| 6,314,432 B1 | * | 11/2001 | Potts, Jr. | |
| 6,317,831 B1 | * | 11/2001 | King | |
| 6,353,839 B1 | * | 3/2002 | King et al. | |

FOREIGN PATENT DOCUMENTS

| | | | |
|---|---|---|---|
| EP | 0840492 | 5/1998 | H04N/1/00 |
| EP | 0877531 | 11/1998 | H04Q/7/32 |
| WO | 9900968 | 1/1999 | H04M/11/00 |
| WO | 9945684 | 9/1999 | H04L/29/06 |

* cited by examiner

*Primary Examiner*—Edward F. Urban
*Assistant Examiner*—Khawar Iqbal
(74) *Attorney, Agent, or Firm*—Antonelli, Terry, Stout & Kraus, LLP

(57) ABSTRACT

The WAP browser in a mobile phone is adapted to permit printing of WML data received and interpreted by the WAP browser. The mobile phone has control circuitry, including a processing unit, a memory connected to the processing unit, and a display. The WAP browser is adapted to interpret received Wireless Markup Language (WML) data and display it on the display. The WAP browser includes a print option which, when selected by the user of the wireless communication device, causes the WML data to be printed.

12 Claims, 3 Drawing Sheets

PRINT OPTION FOR WAP BROWSERS

BACKGROUND

1. Field of the Invention

The present invention relates generally to mobile phones. In particular, it relates to mobile phones having a WAP browser.

2. Discussion of the Related Art

Unlike personal computers, mobile phones typically have unique internal technology and only a small fraction of the resources of a typical desktop or portable computer. This means that the features in the phone are very limited compared to a computer. The reason for this limitation is the size of the phones, i.e. the phone has a severe limitation in processing power, memory space, display size and buttons or keys by which a user can request, view and manipulate information obtained from a hypermedia server. Therefore, it is very important that the features in the phone are made as efficient as possible. Also, the relatively high cost for a call from a cellular phone makes it very important to quickly carry out associated functions.

Despite these limitations, mobile phones have nevertheless been growing rapidly in computing power and can now perform many functions in addition to voice telephony. They can, for example, access remote data services, such as banking, stock quotes and weather forecasts, with Short Messaging Service (SMS) and Wireless Application Protocol (WAP).

WAP 1.1 is a result of continuous work to define an industry wide standard for developing applications over cellular communication networks. The WAP 1.1 Specification Sheet is available to the public at www.wapforum.org/what.technical.htm and is hereby incorporated by reference. WAP 1.1 makes it possible to access, for example, the Internet or other kind of information networks provided with hypermedia servers, from an ordinary cell phone supporting WAP. However, the WAP 1.1 Specification Sheet is concerned only with document encoding, transmission and decoding; there is no discussion of the use of downloaded documents.

WAP is very similar to the current Internet standards. The Internet utilizes a Hypertext Markup Language (HTML), e.g. Java Script, a Hypertext Transfer Protocol (HTTP), Transport Layered Security (TLS)/Secure Sockets Layer (SSL), and a Transport Configuration Protocol (TCP)/User Diagram Protocol (UDP). WAP comprises a Wireless Markup Language (WML) corresponding to HTML, a Wireless Session Layer (WSP) corresponding to HTTP, a Wireless Transport Layered Security (WTLS) corresponding to TLS/SSL, and a Wireless Transport Layer (WTP) corresponding to TCP/UDP. The core of WAP is WML and WML Script, which are interpreted by using a browser resident on the mobile device. Furthermore, WAP comprises different bearers like, for example, SMS, USSD, and CDMA. It is also possible to implement different kinds of services and applications in WAP, e.g. Value Added Services (VAS).

Although software applications in the personal computer environment are well developed and robust, the software in a mobile phone can sometimes be written in a relatively uncommon language and programmers may have difficulty working with that language. Consequently, each new function in the phone, even functions which are relatively simple in other environments, like storing and printing data, is difficult to implement since it must utilize very limited resources, involves low level programming and depends on the phone's internal architecture.

Mobile phones also lack the serial, parallel, and USB ports, ethernet connections and other interfaces common on personal computers. There are thus additional difficulties in carrying out functions, like printing, that require an external device. While there are some wireless infrared methods of transferring data between mobile devices, such as IrCOMM, and Bluetooth, they have underlying protocols which define standard ways to transfer the data. These methods do not define a protocol that works at the uppermost data layer and is understood by both devices. Consequently, there are difficulties in printing data in WML format. Other devices, such as Personal Digital Assistants (PDAs), can print by themselves or can print through a desktop computer. But these devices utilize a HTML browser, such as Pocket Explorer from Microsoft, rather than a WAP/WML browser and can thus use the printing functions available in such a conventional browser.

Printing from mobile phones with browsers is also difficult since the visual part of user interfaces for mobile phones is not standardized and WML content can be shown in different ways. Every mobile phone breaks the text and other parts of the content into several lines in its own way. Printers have much wider lines than mobile phones and can print the text in a more readable format.

BRIEF SUMMARY

The present invention addresses mobile phones with browsers. There are several different aspects and objects of the invention. However, the invention is not limited thereto. A particular implementation of the invention may apply any combination of the aspects and objects of the invention, such that some aspects and objects of the invention may be practiced in a particular implementation of the invention even though some other aspects and object are not practiced in the particular implementation.

An object of the invention is to provide optimal data handling extensions for the browser of a mobile phone to allow additional printing functions. An embodiment of the invention adds the printing functions in the source code of the browser.

One object of the invention is to provide printing capabilities for a mobile phone as a software functionality without adding additional hardware (such as button on a keypad). For example, an embodiment of the invention is implemented by being included in the operating system software of the mobile phone.

Another object of the invention is to make use of a printing facility that is well integrated into the mobile phone and which can be shared by different sub-systems of the device. For example, one embodiment of the invention extends the same printing facility used for printing a phone book or calendar to additionally print the WML content from a WAP browser as well.

A further object of the invention is to provide a mobile phone that is capable of printing a variety of types of data, including WML content, on a separate printer via a direct infrared communication link to that printer.

According to an exemplary embodiment of the invention, the WAP browser in a mobile phone is adapted to permit printing of WML data received and interpreted by the WAP browser. The mobile phone has control circuitry, including a processing unit, a memory connected to the processing unit, and a display. The WAP browser is adapted to interpret received Wireless Markup Language (WML) data and display it on the display. The WAP browser includes a print option which, when selected by the user of the wireless communication device, causes the WML data to be printed.

DETAILED DESCRIPTION

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

The preferred embodiment of the invention seeks to provide an integrated printing extension for a WAP browser in a mobile phone. The invention of course is not limited to such a specific embodiment. It is more broadly directed to any of a diverse set of WAP-enabled mobile phones having a user agent for interpreting is downloaded data.

Figure 1:
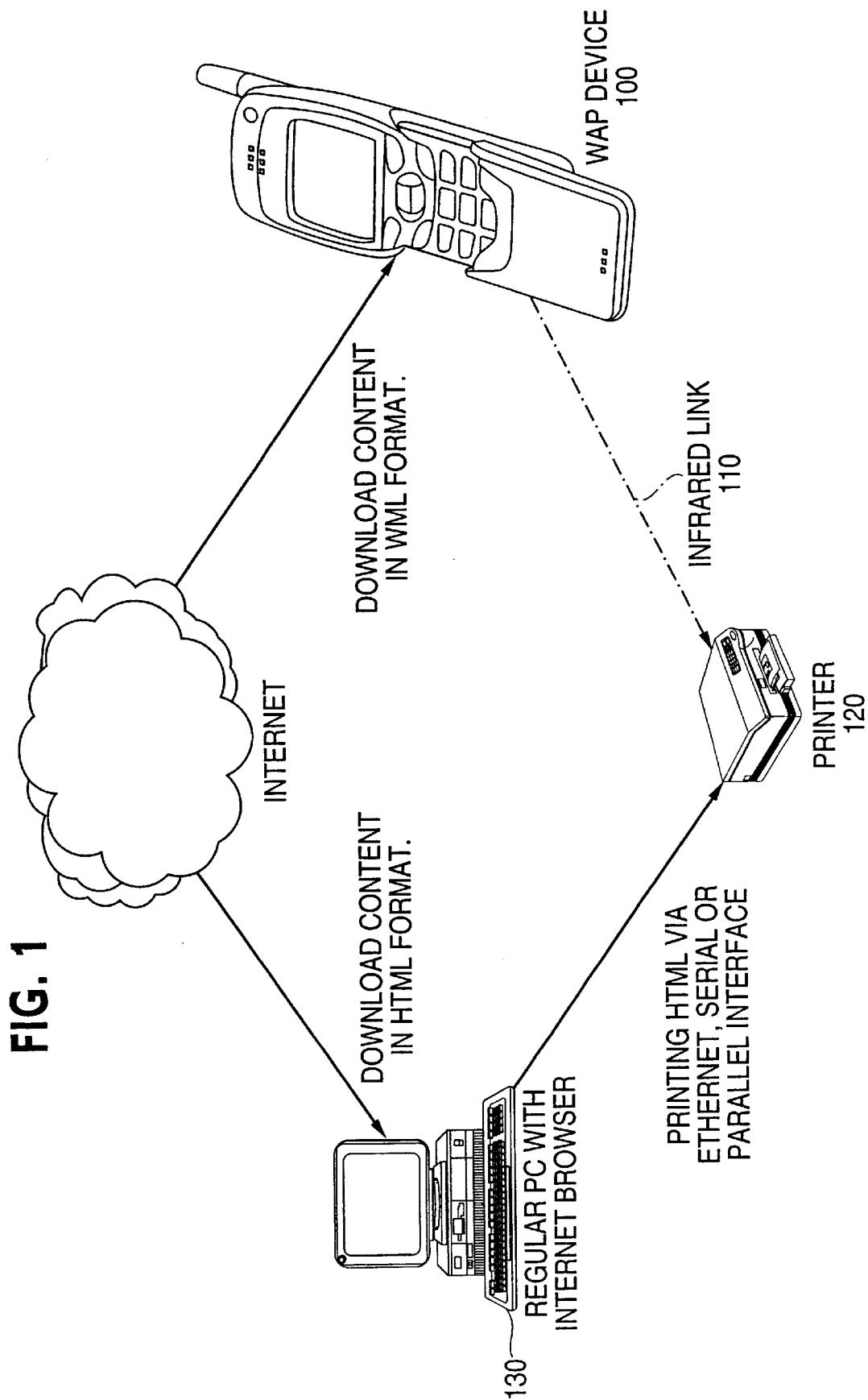
FIG. 1 is a graphical illustration of the preferred implementation of the invention to print data from a WAP device.

FIG. 1 is a graphical illustration useful for showing an application of the preferred embodiment of the invention and for contrasting it with a conventional method. According to the invention, WML formatted content downloaded by a WAP device 100 is printed on a separate printer 120 via an infrared link 110. This is in contrast to the conventional process of downloading HTML format data on a personal computer (PC) with internet browser 130 and printing it via an ethernet, serial or parallel interface.

The WAP device 100 differs from the personal computer with internet browser 130 in that it generally has a less powerful CPU, less memory, restricted power consumption, smaller displays and more limited input devices. The cellular network differs from the Internet network in that it generally has less bandwidth, more latency, less connection stability and less predictable availability. Communication between WAP device 100 and a WAP gateway, connected in turn to at least one web server, is according to the Wireless Application Protocol (WAP). WAP specifies an application framework and network protocols for cellular terminals such as mobile telephones, pagers, and personal digital assistants. WAP brings Internet content and advanced data services to cellular terminals. It is optimized for narrow bandwidth bearers with potentially high latency and is optimized for efficient use of WAP device resources. WAP can work across differing cellular network technologies and bearer types (GSM, CDMA, SMS).

WAP defines a set of standard protocols that enable communication between mobile terminals and network servers. WAP uses a standard naming model according to which standard Internet URLs are used to identify content on servers. It also uses content typing. All WAP content is given a specific type consistent with WWW typing which allows a cellular terminal to correctly process the content based on type. WAP also uses standard content formats and standard communication protocols.

Mobile Phone Architecture

WAP device 100 is preferably implemented as a mobile phone having a keypad, a display, an on/off button, a speaker, and a microphone. It is preferably adapted for communication via a cellular telecommunication network, e.g. a cellular network. However, the phone can also be designed for a cordless network. The keypad has a first group of twelve alphanumeric keys, by means of which the user can enter a telephone number, write a text message (SMS), write a name (associated with the phone number), etc. Each of the keys is provided with a figure "0-9" or a sign "#" or "*", respectively. In alpha mode, each key is associated with a number of letters and special signs used in text editing. The keypad additionally comprises two soft keys, two call handling keys, and a navigation key.

The two soft keys have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys is shown in separate fields in the display just above the keys. The two call handling keys according to the preferred embodiment are used for establishing a call or a conference call, terminating a call or rejecting an incoming call.

The navigation key is an up/down key and is placed centrally on the front surface of the phone between the display and the group of alphanumeric keys. Hereby the user will be able to control this key by simply pressing the up/down key using his/her thumb, i.e., it allows the user to scroll between a group of items in e.g. a menu. Since many experienced phone users are used to one-hand control, it is a very good solution to place an input key, requiring precise motor movements. Thus, the user may place the phone in the hand between the finger tips and the palm of the hand. Hereby, the thumb is free for inputting information. In another embodiment, the scroll key can be a roller key, which is arranged to rotate in one or several directions. The roller allows the user to roll the key to scroll between different items in a menu. In case of a roller key, the soft key can be arranged to the roller, i.e., upon pressing on the roller the same functionality, as the operation key has, could be entered. The roller key has a functionality corresponding to what is known from e.g. the phone Nokia 7110™, which also supports the Wireless Application Protocol (WAP).

Figure 2:
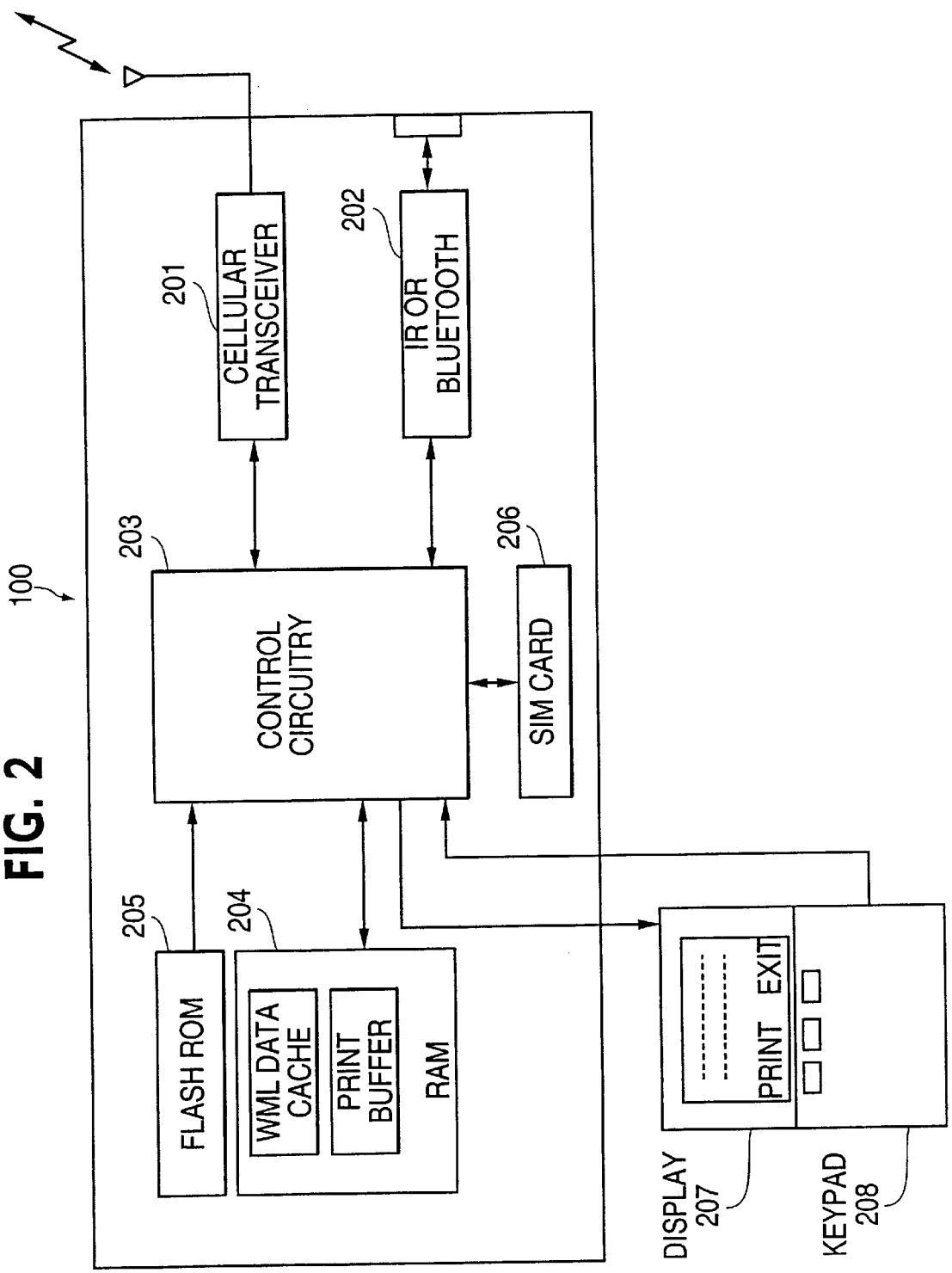
FIG. 2 is a generalized block diagram of a mobile phone with a WAP browser and a display according to one aspect of the invention.

An exemplary embodiment of the mobile phone 100 is shown in FIG. 2. It should be understood that the mobile phone is not limited to such an architecture, and may be adapted as necessary for use in connection with different kinds of cellular networks and various forms of cordless phone systems or in dual band phones accessing sets of these systems/networks.

A microphone (not shown) records the user's speech, and the analog signals formed thereby are A/D converted in an A/D converter (not shown) before the speech is encoded in an audio part (not shown). The encoded speech signal is transferred to control circuitry 203. The control circuitry 203 comprises a processor and pre-installed software, such as a mobile operating system (OS) designed specifically for mobile phones. It also forms the interface to the peripheral units of the apparatus, wherein the peripheral units can comprise a random access memory (PAM) 204, a flash read-only memory (ROM) 205, a SIM card 206, a display 207 and the keypad 208 (as well as data, power supply, etc.). The operating system software and basic applications may be stored in flash ROM 205. The operating system software can contain a number of different features which are integrated into the source code. Minimally, it schedules tasks for the processor in control circuitry 203, manages the various resources of the mobile phone, and provides communication facilities for various peripheral units, such as the printing facility.

Control circuitry 203 communicates with a standard cellular transceiver 201 connecting it to, and adapted to send/receive a request/respond to/from, a telecommunication network. The audio part speech-decodes the signal, which is transferred from the control means to the earpiece via a D/A converter (not shown). Control circuitry 203 also communicates with an infrared (ir) or Bluetooth wireless port 202 enabling it to directly send data to another device via a wireless infrared connection. Port 202 contains the appropriate drivers for establishing a connection with another device, such as a printer. Although display 207 is shown separately in FIG. 2 for simplicity, it is preferably formed integrally with the mobile phone.

The control circuitry 203 monitors the activity in the phone and controls the display in response thereto. Therefore, it is the control circuitry 203 which detects the occurrence of a state change event and changes the state of the phone and thus the display text. A state change event may be caused by the user when he activates the keypad including the navigation key, and these types of events are called entry events or user events. However, the network communicating with the phone may also cause a state change event. This type of event and other events beyond the user's control are called non-user events. Non-user events comprise status change during call set-up, change in battery voltage, change in antenna conditions, message on reception of SMS, etc.

Browser Operation

A Wireless Application Environment which forms an upper layer of the WAP stack includes a browser application, also called a micro-browser. The browser uses Wireless Markup Language (WML), a lightweight markup language, and WML Script a lightweight scripting language. The browser application is arranged to establish a session by reading an item in flash ROM 205. A user interface is connected to the browser application having a display for displaying content and user input means to control the browser. The browser can be arranged in flash ROM 205 or on SIM card 206.

A preferred embodiment of the invention is that a script in flash ROM 205 can activate or download linking applications, i.e., an application which makes it possible to receive and/or transmit different types of data to WAP device 100. For example, the different types of data packets can be a particular text format, software programs, picture formats. This allows the processing power of the terminal to be restricted, allows a standard WAP browser to be used and provides flexibility for new features. This is preferably done by creating extensions to WML and WML script. Thus, the script can make it possible to access data packets, which might not be supported by the software in the terminal, by downloading the appropriate appication, supporting the type of data format, directly to the terminal. The content of the data packet can be displayed, stored, interpreted and/or printed by infrared transmission directly to a printer.

It is preferable to provide one or more distinct linking applications in flash ROM 205 of WAP device 100 prior to establishing communications. This is typically done during the manufacture of WAP device 100, wherein the linking application can be a software program controlling access to the server. A variety of other software applications can also be included and stored in flash ROM 205.

In another aspect of the invention, RAM 204 is arranged to copy items from a session. Typically, RAM 204 can be a cache memory, which means that the items from the latest session can be temporarily saved in the second memory. As an alternative, the items from a session can be saved in a permanent storage memory, which means that the user is able to confirm if the items are goind to be saved or deleted. The permanent storage memory can be SIM card 206 and/or flash ROM 205.

When the mobile phone of the preferred embodiment is activated, the user may select a browser menu on a display controller by the browser application. In this browser menu the user can choose to establish a session to a server. To establish the session the user selects the service connected to the server from the menu. The selection is done by e.g. pressing on one of the soft keys. When the server sends requested information, it is interpreted by the browser application and displayed on display 207. Preferably, display 207 is an liquid crystal display (LCD).

User Interface

Display 207 of WAP device 100 can be controlled by control circuitry 203. When the phone is activated and awaiting an action, e.g, an incoming or outgoing call, an idle mode is displayed. In the bottom of the display, there are two items which are denoted as "Menu" 55 and "Names" 60. If the user selects "Names", he/she can e.g. access a built in phone book. If the user selects "Menu" 55, he/she can select among several different menus. The actual selection of features in the bottom of the display, like "Menu" and "Names", can be selected by means of the soft keys. One of the menus can be the next display called "Browser". If the user chooses to use this menu, he/she can access different telecom related information services, e.g. Internet, using WAP.

During operation, the browser displays a number of options on display 207 of the mobile phone. These options may include the conventional options of clear cache, exit, bookmarks, home page, etc. In an exemplary embodiment, these options are shown at a place on the display that is associated with the soft keys of the phone. The print option is preferably shown at the same place where these other options are shown and selected.

When the print option is selected, the print facility feature integrated into the source code of the operating system causes the control circuitry 203 to perform the various functions necessary to accomplish printing of the received WML data. First, the control circuitry 203 accesses the area in memory where the browser stored the downloaded WML data. The data is preferably stored in the memory in encoded format. An additional area is then set aside in memory where the WML data is prepared to be printed. When the user chooses to print a page, the program decodes the WML data again but into the additional area set aside in memory instead of the display. If necessary, the print facility utilizes the identifier of the WML data also stored in the memory and representing different types of data as discussed above.

Figure 3:
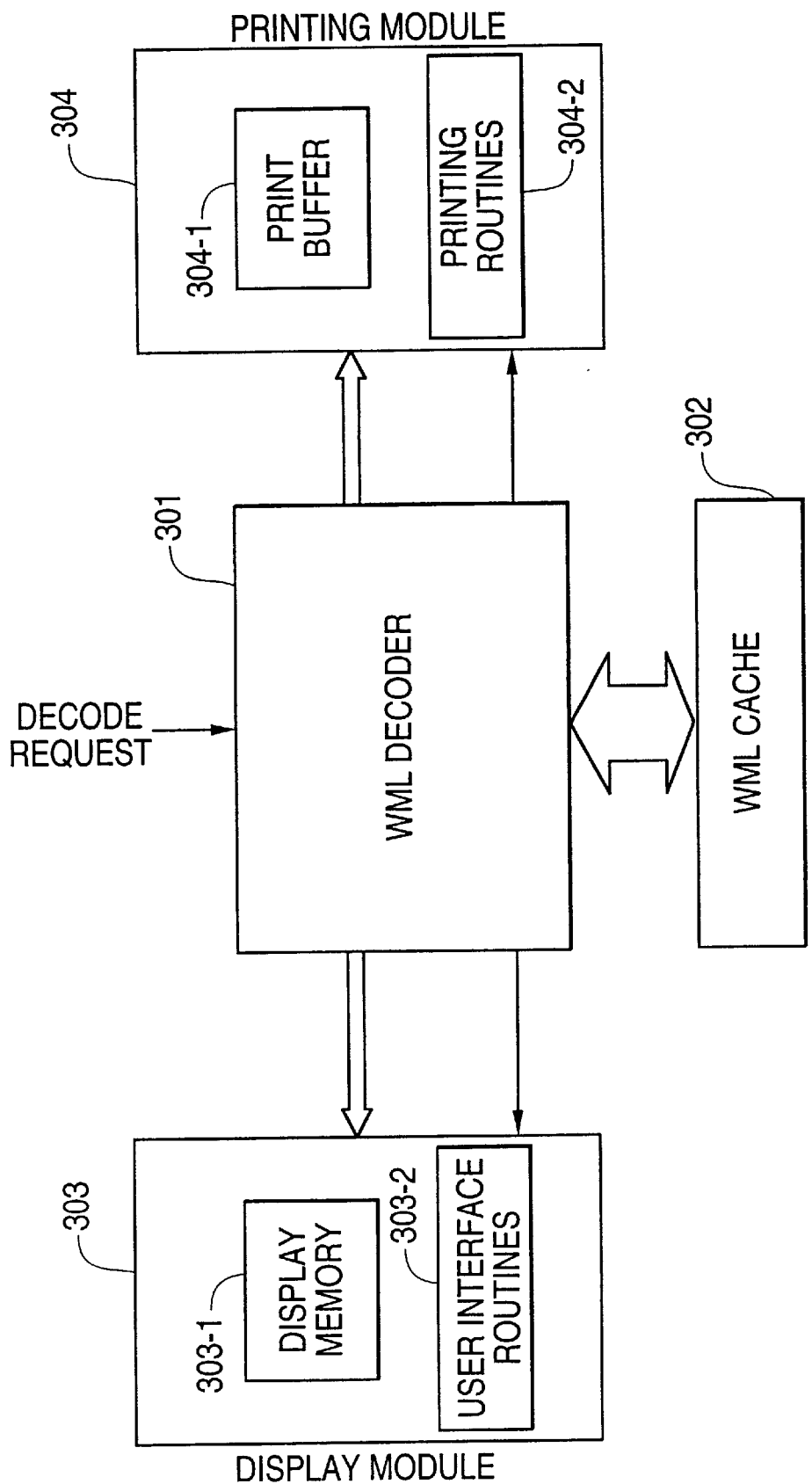
FIG. 3 is a block diagram useful for illustrating a process of decoding and printing data in a mobile phone according to an example embodiment of the invention.

An example of the operation of the printing facility is provided in FIG. 3. While a block diagram form is employed in FIG. 3 to represent the WML decoder 301 and other elements of the printing facility, it should not be misinterpreted that the elements are necessarily implemented as hardware components. The blocks are chosen so as to best illustrate the parts of the process and the various elements can be implemented in any number of different ways, including, but not limited to, software.

WML decoder 301 receives a decode request for downloadded WML data from cellular transceiver 201 of the mobile phone. The WML data may be immediately decoded or may be temporarily stored in WML cache 302 prior to decoding. The WML cache 302 is preferably organized in sizes so as to facilitate the quick storage and retrieval of entire pages of WML data at one time. A display module 303 includes a display memory 303-1 and user interface routines 303-2 for the display 207. The user interface routines 303-2 handle the user actions and input fields of the user interface and translates them so that they can be used by the operating system software of the mobile phone. A printing module 304 contains a print buffer 304-1 and printing routines 304-2. The printing routines 304-2 are preferably part of the browser, but utilize the appropriate application programming interface (API) of the operating system software to implement the printing facility of the mobile phone.

The WML decoder 301 is operated in conjunction with the WML cache 302, display module 303 and printing module 304 to print the WML data when the print option of the browser is selected by the user. In particular, WML decoder 301 supports different line lengths, output buffers and handlers. This is especially important since the character width of the display 207 controlled by display module 303 is typically much narrower than the character width of the printing facility controller by printing module 304. WML decoder 301 makes the necessary conversions and wraparounds so that the decoded WML data displayed on display 207 can be suitably printed.

Printing to an external printer is carried out by directing control circuitry 103 to try to establish a connection to a printer via the infrared port 202. Alternatively, the printing is carried out using Bluetooth wireless transfer. The driver for this service is integrated into the source code of the pre-installed operating system since communication with an infrared port is not normally required for a mobile phone. In one aspect of the invention, the driver is able to transmit data via infrared port 202 from sources other than the browser. For example, it may be used to send out data for printing a phonebook, calendar, etc. If the connection to the printer is established, the program sends a page of data to the printer. If the infrared port 202 is unable to make a connection to the printer or there isn't any receiving printer, an error message is displayed to alert the user.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed:

1. A mobile phone comprising:

control circuitry, including a processing unit;

a memory connected to the processing unit;

a display; and a Wireless Application Protocol (WAP) browser adapted to interpret received Wireless Markup Language (WML) data and display said WML data on said display, wherein said WAP browser includes a print option which, when selected by the user of the mobile phone, causes said WML data to be printed.

2. The mobile phone recited in claim 1, wherein the WML data is stored at a location in said memory prior to selection of the print option.

3. The mobile phone recited in claim 2, wherein said WML data is read from said location in said memory when said print option is selected and is decoded prior to printing.

4. The mobile phone recited in claim 1, wherein the WML data is printed via a direct infrared interface to a printer.

5. The mobile phone recited in claim 1, wherein the WML data is transferred to the printer using Bluetooth wireless transfer.

6. The mobile phone recited in claim 1, wherein the print option is selected by the user in accordance with a menu displayed on said display.

7. The mobile phone recited in claim 6, wherein the user selects the print option by pressing a soft key associated with the menu.

8. The mobile phone recited in claim 1, wherein the print option utilizes a printing facility which can print data from sources other than said WML data interpreted by said WAP browser.

9. The mobile phone recited in claim 8, wherein the printing facility can also print a phone book or calendar stored in the mobile phone.

10. The mobile phone recited in claim 8, wherein the character width of lines in said display is narrower than the character width of lines printed by said printing facility.

11. The mobile phone recited in claim 8, wherein the printing facility is included in operating system software of the mobile phone.

12. The mobile phone recited in claim 1, wherein said print option causes said WML data to be printed on an external printer with the character width of the printed WML data modified according to the characteristics of the external printer.

* * * * *